US 6,740,394 B2

(12) United States Patent
Jacobsen et al.

(10) Patent No.: US 6,740,394 B2
(45) Date of Patent: May 25, 2004

(54) FILM LAMINATES AS HIGH BARRIER FILMS AND THEIR USE IN VACUUM INSULATION PANELS

(75) Inventors: Sven Jacobsen, Fallingbostel (DE); Christian Kuckertz, Olpe (DE); Rainer Brandt, Walsrode (DE)

(73) Assignee: Wipak Walsrode GmbH & Co. KG, Walsrode (DE)

( * ) Notice: Subject to any disclaimer, the term of this patent is extended or adjusted under 35 U.S.C. 154(b) by 0 days.

(21) Appl. No.: 09/961,099

(22) Filed: Sep. 21, 2001

(65) Prior Publication Data

US 2002/0090522 A1 Jul. 11, 2002

(30) Foreign Application Priority Data

Sep. 22, 2000 (DE) .......................................... 100 47 043

(51) Int. Cl.$^7$ ............................. B32B 7/02; B32B 15/08
(52) U.S. Cl. ........................ 428/216; 428/215; 428/336; 428/318.4; 428/319.3; 428/319.7; 428/319.9; 428/458; 428/461; 428/463; 428/476.1; 428/476.3; 428/480; 428/483; 428/515; 428/516; 428/517; 428/519
(58) Field of Search ................................ 428/213, 215, 428/216, 336, 318.4, 319.3, 319.7, 319.9, 451, 458, 461, 463, 476.1, 476.3, 480, 483, 515, 516, 517, 519

(56) References Cited

U.S. PATENT DOCUMENTS

| 5,112,673 | A | * | 5/1992 | Sawada et al. ............ 428/216 |
| 5,122,410 | A | * | 6/1992 | Lofgren et al. ............ 428/216 |
| 5,725,958 | A | * | 3/1998 | Matsuda et al. ............ 428/446 |
| 2001/0049014 | A1 | | 12/2001 | Jacobsen et al. ............ 428/336 |

FOREIGN PATENT DOCUMENTS

| EP | 0 517 026 | 12/1992 | |
| EP | 0 535 977 A1 | 4/1993 | ............ B32B/1/06 |
| EP | 0 878 298 | 11/1998 | |

* cited by examiner

*Primary Examiner*—D. S. Nakarani
(74) *Attorney, Agent, or Firm*—Norris McLaughlin & Marcus PA

(57) ABSTRACT

Multi-layer film laminate is described having at least 4 layers comprising at least one layer (I) as surface layer vapor-coated with aluminum or SiOx or a metal oxide from main groups 2 or 3, a gas barrier layer (II), at least one further layer (III) vapor-coated with aluminum or SiOx or a metal oxide from main groups 2 or 3 and a heat-sealable layer (IV), wherein the vapor-coated surface of layer (I) is adjacent to the following layer.

Their use as high gas barrier films as wrapping of vacuum insulation panels is also described.

19 Claims, No Drawings

FILM LAMINATES AS HIGH BARRIER FILMS AND THEIR USE IN VACUUM INSULATION PANELS

The present invention relates to film laminates which are particularly impermeable for gas, and to the use of these gas impermeable film laminates as wrapping material of vacuum insulation panels.

BACKGROUND OF THE INVENTION

In some special technical products, such as e.g. in the production of vacuum insulation panels (VIPs), films are needed which possess extremely low gas permeability values to guarantee that the vacuum, once applied, and thus the serviceability of the VIPs, is maintained over a very long period (10–15 years).

Conventional barrier films made of plastics, as described e.g. in EP-A 0 517 026, do not achieve the gas barrier effect needed. Composites containing an aluminium foil, while they do possess a total gas barrier, are undesirable in many applications because of the thermal conductivity of aluminium.

In addition, metallised films or films vapour-coated with SiOx are known which avoid the disadvantages relating to the thermal conductivity of the pure metal foils (as described e.g. in EP-A 0 878 298), and achieve higher barrier effects than pure plastic films, but their values are also a long way from the gas barrier values required.

Vacuum insulation panels (VIPs) here mean sheet-like objects which consist of an insulating material and/or filler and are wrapped in a high-barrier film by vacuum packing. The type, and particularly the level, of the vacuum here are dependent on the insulating material or filler used and on the insulating action required of the VIP. Over the service life of the VIP, the wrapping with a high barrier film prevents the diffusion of gases, which impair the vacuum and thus the insulating properties of the VIP. Metal foils are undesirable as the high-barrier films, since these conduct heat over the edges of the sheet-like VIP and thus reduce the insulation performance.

The object of the present invention was therefore to provide film laminates which achieve a particularly high gas barrier effect without using thermally conductive metal foils as components. At the same time, mechanical and thermal properties of the film laminate should be improved. In particular, film laminates suitable for the production of vacuum insulation panels (VIPs) should be provided.

SUMMARY OF THE INVENTION

According to the invention, this is achieved by providing of a multi-layer film laminate comprising at least 4 layers (I) to (IV), arranged directly or indirectly in the following sequence:

layer (I) as one surface layer of the film laminate comprising at least one layer vapour-coated with aluminum or SiOx or a metal oxide from the main groups 2 or 3, whereby the vapour-coated surface is adjacent to the following layer,
layer (II) as a gas barrier layer of resin,
layer (III) comprising at least one further layer vapour-coated with aluminum or SiOx or a metal oxide from the main group 2 or 3 and
layer (IV) as a heat-sealable layer, which is the other surface layer of the film laminate.

It would be expected for the gas barrier effect of the film laminate according to the invention to be provided by the gas barrier effect of the individual film with the lowest permeability, or to be calculated from the sum of the barrier effects of the individual films, but surprisingly, gas barrier effects are achieved which are not only distinctly higher than those of the individual films but are even higher than those of the sum of the individual films.

In order to obtain even further increased gas permeability values the film laminates according to the invention can contain the layer (I) and/or the layer (III) preferably more than one time, and this layer or these layers can be vapour-coated or not vapour-coated with aluminium or SiOx, with x for 1–2, preferable 1.5–1.8, or a metal oxide from main groups 2 or 3 and the vapour-coated surfaces of the layers (I) and/or (III) are preferable adjacent to each other.

DETAILED DESCRIPTION

The layers vapour-coated with aluminium or SiOx or a metal oxide from main groups 2 or 3 can consist of any conventional thermoplastic resins, particularly of resins of at least one polyester, polyamide, polyolefin or a copolymer thereof. These layers (I) and/or (III) can also consist of a coextrudate of different polymers, which consists of at least one layer, particularly two layers of one of the above mentioned thermoplastic resins, and a gas barrier layer of resin, particularly of a hydrolysed ethylene vinyl acetate (EVOH) with 25–45 Mol-% vinyl acetate and is sandwiched particularly between two layers of the mentioned thermoplastic resins. The thickness of the individual layers (I) and/or (III) and the each entire thickness is not essential, but can influence the gas barrier effect to a small degree and will help to determine the mechanical and thermal properties of the film laminate.

With the film laminates according to the invention oxygen permeability values of less than 0.1 $cm^3/m^2$ d bar (23° C., 75% r.h.), in particularly of less than 0.05 and in particularly of $\leq 0.01$ and water vapour permeability values of $\leq 0.1$ $g/m^2$ d (38° C., 90% r.h.) can be achieved. The oxygen permeability is determined according to DIN 53380-3 and the water vapour permeability according to DIN 53122. Through the combination of different layers, not only can the gas permeability values be adjusted to the values required by the application, but it is also possible, by modifying the material of the layer vapour-coated with aluminium or SiOx or a metal oxide from main groups 2 or 3, to vary the mechanical and/or thermal reference values of the resulting film laminate according to the invention.

If a polyamide vapour-coated with aluminium or SiOx or a metal oxide from main groups 2 or 3 is arranged as the surface layer (I), the resulting film laminate is also distinguished, in addition to the low gas permeability values, by high mechanical stability, particularly by high puncture resistance which offers advantages in the handling of the film laminates according to the invention and thus prevents damages of the laminate during wrapping. The VIPs must, in some cases, withstand large mechanical loads, both during manufacture and during installation in the final application, which can lead to damage to the wrapping and thus to the gas barrier properties.

A layer based on polypropylene vapour-coated with aluminium or SiOx or a metal oxide from main groups 2 or 3 which is distinguished by a particularly good water vapour barrier is preferably selected as the outer layer (I). If this outer layer is combined with a layer (III) consisting of a polypropylene layer vapour-coated with aluminium or SiOx or a metal oxide from main groups 2 or 3, which is also distinguished by a particularly good water vapour barrier, the film laminate according to the invention formed therefrom will be distinguished both by a better water vapour barrier compared with the individual polypropylene layers and by an extremely improved oxygen barrier, since the inner gas barrier layer (II) of polyvinyl alcohol is protected from being damaged by water vapour.

One or more of the layers (I) and/or (III) vapour-coated with aluminium or SiOx or a metal oxide from main groups 2 or 3 is also preferably a coextrudate, which consists of at least one layer (a) of polyamide and at least one gas barrier layer (b) of resin. A 3-layer coextrudate as layer (I) and/or layer (III) of polyamide as the outer layers and hydrolysed ethylene vinyl acetate copolymer (EVOH) as oxygen barrier layer inbetween is particularly suitable. The gas barrier layer ensures extremely improved gas barrier values in the resulting film laminate according to the invention, and particularly when EVOH is used as the gas barrier layer the oxygen barrier values are improved.

In a particularly preferred combination, one or more of the layers (I) and/or (III) are vapour-coated with aluminium, preferably in a thickness of 30 to 80 nm.

Homo- or copolyolefins can be used as material for the heat-sealable layer (IV). Linear low density polyethylene (LLDPE), low density polyethylene (LDPE), metallocenic polyethylene, polypropylene (PP), polybutylene (PB), ethylene vinyl acetate copolymers (EVA), high density polyethylene (HDPE), ionomers (IO) and mixtures of these substances, and also amorphous polyester and amorphous polyethylene terephthalate (aPET), are preferred. A multilayer coextrudate of the heat-sealable layer (IV) of the above materials is also possible according to the invention. The thickness of the heat-sealable layer (IV) is preferably 20 to 200 $\mu$m, particularly 50 to 100 $\mu$m.

The film laminate according to the invention used for the production of VIPs comprises preferably a heat-sealable layer (IV) of a free-flowing material, particularly an ionomer, that guarantees particularly gas-tight sealed seams under the dusty production conditions typical of VIP manufacture.

For the bond between the individual layers of the laminate according to the invention, commercial reactive adhesives, such as in particular 2-pack polyurethane adhesives, are preferably used. However, polyolefinic adhesion promoters, preferably polyethylene, ethylene ethyl acrylate (EEA) or ethylene methyl methacrylate (EMMA), can also be used. The gas barrier effect of the film laminate according to the invention is not substantially dependent on the type of bond between the individual layers, however.

In the case of the use of the two-pack polyurethane adhesives in particular, it should be ensured that the component composition is selected such that the lowest possible generation of gas takes place.

A further object of the invention is the use of the inventive film laminates as high barrier films, in other words almost gas impermeable barrier films, as wrapping of vacuum insulation panels.

A further object of the invention are vacuum insulation panels with an inventive film laminate as gas tight wrapping of an insulating material or filler. Any type of insulating materials or fillers, as conventionally used in vacuum insulation panels, is possible, particularly an insulating material of polyurethane foam or polystyrene foam each with open cells and/or a filler material of silicium oxide.

Examples of film laminates which describe the film laminates according to the invention in more detail, but which do not limit the scope of the invention, are reproduced below.

EXAMPLES

A film laminate A) of (I) a polyamide layer vapour-coated with aluminium, vapour-coated surface facing (Ia),
(Ia) a polyester layer vapour-coated with aluminium, vapour-coated surface facing (I),
(II) a polyvinyl alcohol layer as oxygen barrier layer,
(III) a polyester layer vapour-coated with aluminium, vapour-coated surface facing (IV),
(IV) a polyethylene heat-sealable layer.

The film laminate setted out above was produced as follows:

The individual layers (I) and (Ia) vapour-coated with aluminium were first laminated with the vapour-coated sides adjacent to give a first pre-composite (VV1). Thus, the two sensitive coatings were protected from damage by the following operations. This lamination was performed by means of a solvent-containing, polyurethane-based adhesive system, the components of which (polyisocyanate and polyol) were stoichiometrically coordinated so that no $CO_2$ formation occurs during curing of the adhesive and the bond strength was not effected. A lamination in air-conditioned rooms with (low) defined humidity was advantageous. These peripheral conditions to be observed in principle also applied to all the other laminations.

The polyester layer (III) vapour coated with aluminium was laminated with the metallised side against the PE heat-sealable layer (IV) (pre-composite VV2).

A polyvinyl alcohol layer (II) was laminated on the already produced pre-composite VV1. This pre-composite VV3 was laminated together with the already produced pre-composite VV2 in a final step. The laminations were usually carried out at laminating speeds of between 150 and 250 m/min. Technically, any other speed is possible as these depend particularly on the technical conditions of the laminating machine used.

The film laminate according to the invention exhibited an extreme low permeability for gases and water vapour, respectively, e.g. an oxygen permeability at 23° C. and 75% relative humidity below the limit of detection of 0.05 $cm^3/m^2d$ bar determined according to DIN 53380-3 and a water vapour permeability at 38° C. and 90% relative humidity of <0.05 $g/m^2d$ determined according to DIN 53122.

Further film laminates according to the invention with the following composition were produced in the same way as mentioned above:

B)
(I) A polyamide layer vapour-coated with aluminium, vapour-coated surface facing (II),
(II) a polyvinyl alcohol layer,
(III) a polyester layer vapour-coated with aluminium, vapour-coated surface facing (II),
(IV) a polyethylene heat-sealable layer.

C)
(I) A polypropylene layer vapour-coated with aluminium, vapour-coated surface facing (II),
(II) a polyvinyl alcohol layer,
(III) a polyester layer vapour-coated with aluminium, vapour-coated surface facing (IV),
(IV) a polyethylene heat-sealable layer.

D)
(I) A polyamide layer vapour-coated with aluminium, vapour-coated surface facing (II), (II) a polyvinyl alcohol layer, (III) a polypropylene layer vapour-coated with aluminium, vapour-coated surface facing (IV), (IV) a ionomer heat-sealable layer.

E)

(I) A co-extrudate of polyamide/EVOH/polyamide layer vapour-coated with aluminium, vapour-coated surface facing (II), (II) a polyvinyl alcohol layer, (III) a polyester layer vapour-coated with aluminium, vapour-coated surface facing (IIIa), (IIIa) a polyester layer vapour-coated with aluminium, vapour-coated surface facing (III), (IV) an amorphous polyethylene terephthalate heat-sealable layer.

F)

(I) A polyamide layer vapour-coated with aluminium, vapour-coated surface facing (Ia), (Ia) a polyester layer vapour-coated with aluminium, vapour-coated surface facing (I), (II) a polyvinyl alcohol layer, (III) a polyester layer vapour-coated with aluminium, vapour-coated surface facing (IIIa), (IIIa) a polyester layer vapour-coated with aluminium, vapour-coated surface facing (III), (IV) a polypropylene heat-sealable layer.

G)

(I) A polyamide layer vapour-coated with SiOx, vapour-coated surface facing (II), (II) a polyvinyl alcohol layer, (III) a polyester layer vapour-coated with SiOx, vapour-coated surface facing (II), (IV) an ionomer heat-sealable layer.

H)

(I) A polypropylene layer vapour-coated with SiOx, vapour-coated surface facing (II), (II) a polyvinyl alcohol layer, (III) a polyester layer vapour-coated with aluminium, vapour-coated surface facing (II), (IV) a polyethylene heat-sealable layer.

The oxygen permeability of the film laminates B)–H) was below the limit of detection of 0.05 cm$^3$/m$^2$ d bar determined according to DIN 53380-3.

What is claimed is:

1. Multi-layer film laminate having a first surface layer and a second surface layer, and comprising at least 4 layers (I) to (IV) arranged directly or indirectly in the following sequence:

a) at least one thermoplastic polymer layer (I) as the first surface layer, vapor-coated with aluminum, whereby the vapor-coated surface is adjacent to the following layer, b) layer (II) as a gas barrier layer of an ethylene vinyl alcohol copolymer or polyvinyl alcohol, c) at least one further thermoplastic polymer layer (III), vapor-coated with aluminum and d) layer (IV) as a heat-sealable layer of a thermoplastic polymer, which is the second surface layer of the film laminate.

2. Multi-layer film laminate according to claim 1, wherein the gas barrier layer (II) is a polyvinylalcohol layer.

3. Multi-layer film laminate according to claim 1, wherein the layer (I) and the layer (III) are based on identical or different resins.

4. The multilayer laminate of claim 3, wherein the layer (I) and the layer (III) are based on different resins.

5. Multi-layer film laminate according to claim 1, wherein the layer (I) and/or the layer (III) are themselves each made up of at least two layers and the vapor-coated surfaces are adjacent to each other.

6. Multi-layer film laminate according to claim 5, wherein the at least two layers (I) are each based on different resins.

7. The multilayer film laminate of claim 6, wherein said different resins are polyamide and polyester or polypropylene and polyester.

8. Multi-layer film laminate according to claim 5, wherein the at least two layers (III) are based on identical resins.

9. The multilayer film laminate of claim 8, wherein said identical resins are polyester resins.

10. Multi-layer film laminate according to claim 1, wherein the layer (I) and/or (III) are made of a coextrudate of at least two layers, comprising a resin gas barrier layer.

11. Multi-layer film laminate according to claim 10, wherein the coextrudate comprises two polyamide layers (a) and a gas barrier layer (b).

12. The multilayer film laminate of claim 11, wherein said gas barrier layer is a hydrolyzed ethylene vinyl acetate copolymer, and is sandwiched between said polyamide layers.

13. The multilayer film laminate of claim 10, wherein said resin gas barrier layer is an oxygen barrier layer.

14. Multi-layer film laminate according to claim 1, wherein each aluminum vapor-coated layer has a thickness of 30–80 nm.

15. Vacuum insulation panels with a hermetically sealed wrapping comprising a multi-layer film laminate according to claim 1, whereby layer (I) is the outside surface layer of the wrapping.

16. Vacuum insulation panels according to claim 15 further comprising an insulation material based on polyurethane foam or polystyrene foam each with open cells and/or a filler material based on silicium oxide.

17. A vacuum insulation panel wrapped with a gas impermeable wrapping according to claim 1, wherein layer (I) is the outside surface of the wrapping.

18. The multilayer film laminate of claim 1, wherein said thermoplastic polymer of the heat-sealable layer is selected from the group consisting of LDPE, LLDPE, polypropylene, polybutylene, metalocenic polyethylene, HDPE, ethylene propylene copolymers, ethylene vinyl acetate copolymers, amorous polyester and ionomers.

19. The multilayer film laminate of claim 18, wherein said thermoplastic polymer of the heat-sealable layer is an amorphous polyethylene terephthalate or an ionomer.

* * * * *